(12) United States Patent
Bishop et al.

(10) Patent No.: US 6,658,644 B1
(45) Date of Patent: Dec. 2, 2003

(54) SERVICES-BASED ARCHITECTURE FOR A TELECOMMUNICATIONS ENTERPRISE

(75) Inventors: Michael Bishop, Fort Collins, CO (US); Susan B. Ericksen, Cherry Hills Village, CO (US); Terry Johnston, Denver, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/474,674

(22) Filed: Dec. 29, 1999

(51) Int. Cl.[7] .............................. G06F 9/44; G06F 17/60

(52) U.S. Cl. .............................. 717/102; 717/104; 705/1

(58) Field of Search .................................. 717/100–123; 707/1, 3–7, 9–10, 100, 104.1; 709/201, 217–219, 225, 227, 229, 310, 318, 328; 705/1

(56) References Cited

U.S. PATENT DOCUMENTS

| | | | | |
|---|---|---|---|---|
| 6,167,564 A | * | 12/2000 | Fontana et al. | 717/104 |
| 6,269,473 B1 | * | 7/2001 | Freed et al. | 703/22 |
| 6,405,364 B1 | * | 6/2002 | Bowman-Amuah | 717/101 |
| 6,442,748 B1 | * | 8/2002 | Bowman-Amuah | 707/103 R |

OTHER PUBLICATIONS

Tracz et al., Domain–specific Software Architecture engineering Process Guidelines, , 1993, IBM Corporation, Federal Sector Division.*

* cited by examiner

Primary Examiner—Hoang-Vu Antony Nguyen
(74) Attorney, Agent, or Firm—Brooks Kushman P.C.

(57) ABSTRACT

A system and method for developing software applications for reuse is disclosed. The instant invention defines first, a service which is a well-known dynamically callable software program that is currently in existence and is running somewhere in the business concern or enterprise on a computer network. A service has a well-known name and a published interface describing its various inputs and outputs. The service is available to any program or other service that has a need for the functions and outputs of the service through an established network protocol. The service runs independently of a calling program, and does not require the calling program to implement or import any of the service implementation code. Thus, the instant invention provides true sharing of running programs by the applications that need the functions and outputs provided by the population of services. Additionally, the instant invention discloses a method for organizing a plurality of services. This organization is called logical layering. Logical layering provides a structure whereby a service can be developed at the right level of complexity and functionality so as to allow future programs or services to call an existing service without requiring the redundant and wasteful task of redesigning the service.

13 Claims, 7 Drawing Sheets

SERVICES-BASED ARCHITECTURE FOR A TELECOMMUNICATIONS ENTERPRISE

TECHNICAL FIELD

The present invention relates to software architecture and a method for creating and developing software for reuse.

BACKGROUND ART

The development of large-scale business applications has always been a problematic task. The steps of gathering requirements, designing the application, selecting the appropriate technology, testing the implementation, and deploying the resulting product is typically done in isolation and without an awareness of other applications that already exist or are being developed simultaneously.

When software applications are developed within a business enterprise in this manner many of the same business and technical problems are being addressed and solved by separate and distinct software applications. Typically, the software applications are created by different programming groups within the business enterprise which results in applications having different designs and different technologies, thus, sharply diminishing the possibility of code reuse. Moreover, development times are lengthened since generally each programming group solves similar sets of problems for each application being developed.

A further complication that arises from developing applications in this "stove pipe" fashion is that the operating environment for the applications becomes cluttered with many different brands of technology resulting in increased operational complexity. An ineffective utilization of computer resources also results.

One technology which has been developed to combat the problem of code reuse is object-oriented programming. The advent of object-oriented programming technologies such as C++ and Java allows for constructing objects that may, in theory, be reused from one application to another. Reuse is one of the highly advertised advantages of these programming technologies, but there are some shortcomings. Languages such as C++ and Java allow programmers to construct software objects, however they do not prescribe how such objects should be built so that another program can easily reuse them. For example, if a programmer designs a business object that can process credit card transactions and the object provides a graphical user interface for inputting the transactions, typically the graphical user interface cannot be easily separated from the object. Consequently, another programmer wishing to the use the object, but without the graphical user interface, would need to re-design the object.

Another limitation of today's object-oriented programming technologies is that they do not directly support dynamically-shared object reuse. For instance, if a programmer wants to reuse a C++ object, the programmer must include the object definition in the new program, create an instance of the object, and manage the object as part of the new program. The instantiated object that exists in the original program is not accessible to the new program, thus, a copy of the object must be created inside the new program. Although this technique results in some code reuse it does not result in true object or program sharing. The definitions of the objects are shared, but not the objects themselves.

SUMMARY OF THE INVENTION

Therefore, it is an object of the present invention to provide a system and method for building large-scale business applications having reusable software programs Known as services.

Accordingly, the present invention provides a system and a method for developing software applications for reuse. The instant invention defines first, a service which is a well-known, dynamically callable software program that is currently in existence and is running somewhere in the business concern or enterprise on a computer network.

A service has a well-known name and a well-defined interface that clearly and precisely defines the service's inputs and outputs. In order for the service to be well-known, the service name, the interface definition, and location where the service runs, are published in a services directory. If another service or program wants to use this service, it may look up the information needed to call the service in the services directory. Having this information about the service registered and available for use by other services or programs means that the service is location-transparent.

The service is available to any program that has a need for the outputs provided by the service through an established and agreed-upon network protocol. Having a consistent network communication protocol across the population of all services provides a quality called ubiquitous service connectivity, meaning that any service or program can call on the functions of any other service, using the established network communication protocol.

The service runs independently of the calling program, and does not require the calling program to implement or import any of the service implementation code. Having the services run independently of each other means that the services are implementation-transparent. Thus, the instant invention provides true sharing of running programs by the applications that need the functions provided by those services. Additionally, the instant invention provides a framework for organizing a plurality of service programs. This framework is called logical layering. Logical layering provides a structure whereby a service can be developed at the right level of complexity and functionality so as to allow future programs to call the service without requiring the redundant and wasteful task of redesigning the service.

The services-based method prescribes that each new application is designed out of a cooperating set of services. The present invention requires that software developers discover what services are currently available, and which of these services may be reused. Moreover, a developer must also understand which services must be implemented for the first time and at which logical level they are needed. Over time, the present invention provides the business enterprise with a set of re-useable services which will make it easier and faster to build each new enterprise application.

The above qualities, features, and advantages of the present invention will be readily apparent from the following detailed description of the best mode for carrying out the invention when taken in connection with the accompanying drawings.

BEST MODE FOR CARRYING OUT THE INVENTION

Figure 1:
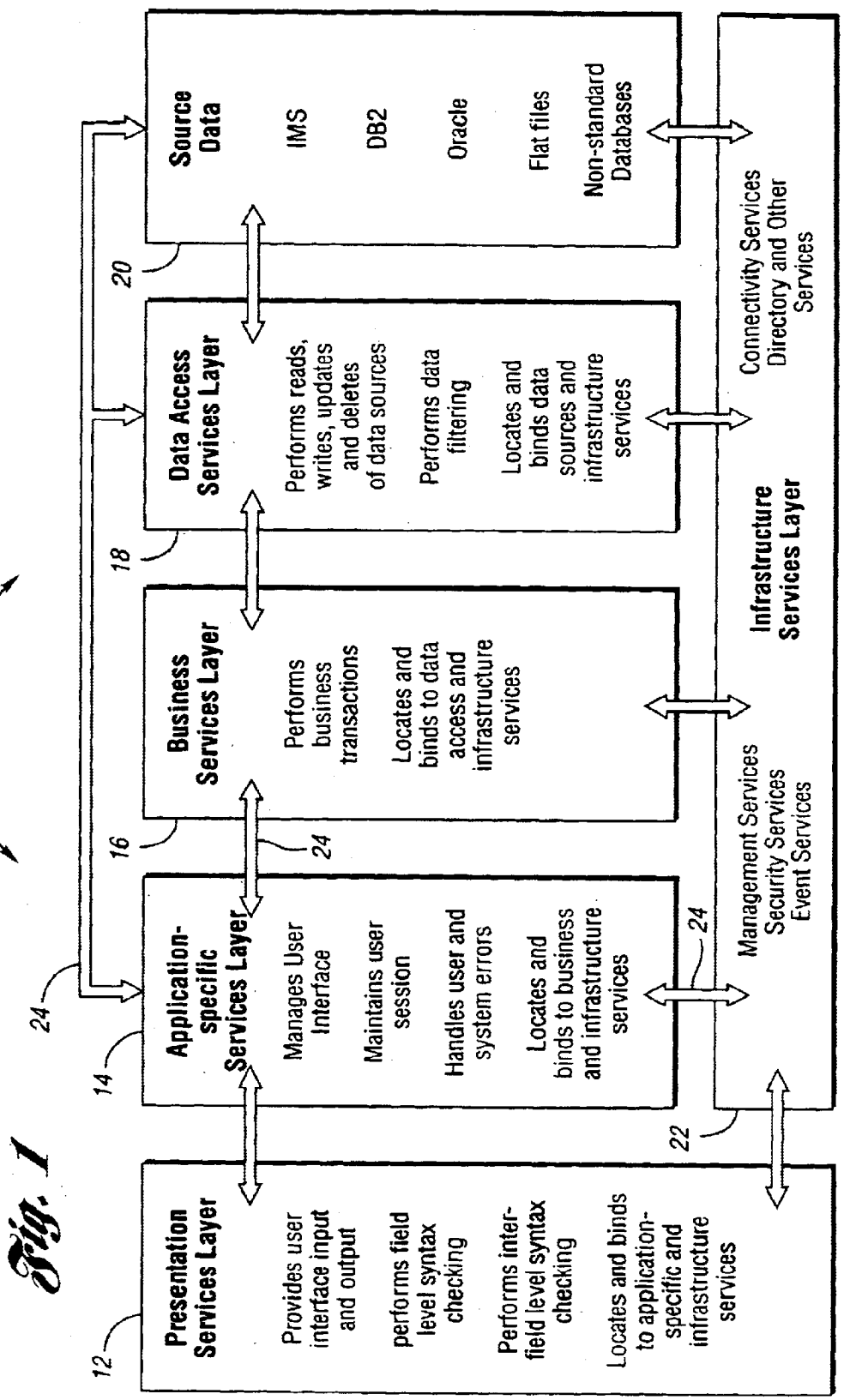
FIG. 1 is a block diagram illustrating the logical layers of a services-based architecture, in accordance with the present invention.

With reference to FIG. 1, a services-based architecture 10 is shown having a presentation services layer 12, an application-specific services layer 14, a business services layer 16, a data access services layer 18, a source data layer 20, and an infrastructure services layer 22. The presentation services layer 12 is comprised of services which are computer software programs that provide a user with an interface including human-viewable inputs and outputs. Additionally, services in this layer perform intra-text field syntax checking, inter-text field syntax checking, as well as locating and binding to application-specific services and infrastructure services.

The application-specific services layer 14 is comprised of services which are programs which manage a user interface, maintain the user session, and handle user and system errors. Additionally, application-specific services locate and bind to the business and infrastructure services. The business services layer 16 is comprised of services which are programs that perform business transactions or a unit of work that is recognizable by the business enterprise. Other functions of services within business services layer 16 include locating and binding to the data access and infrastructure services. The data access services layer 18 is comprised of services which are programs that perform reads, writes, updates and deletes of data sources. Other functions of the data access services layer include data filtering. Services in the data access services layer further perform the function of locating and binding to the data sources and the infrastructure services. The source data layer 20 is essentially comprised of data storage structures such as conventional databases. Other non-standard databases are also included. Typical databases include IMS, DB2, Oracle and text files. Finally, services residing in the infrastructure services layer 22 provide location and connectivity functions for allowing any service to locate and connect to any other service previously described. The infrastructure services layer also provides services which perform management, security, event notification, and various other technical support functions for the presentation, application-specific, business, and data access services layers.

Communication among the services defined in the services-based architecture is accomplished through a common network communication protocol 24 that is integrated into each service. The common network communication protocol allows any service to call the functions provided by any other service. In normal usage, however, the logical layering of the services as shown in FIG. 1 is respected.

Figure 2:
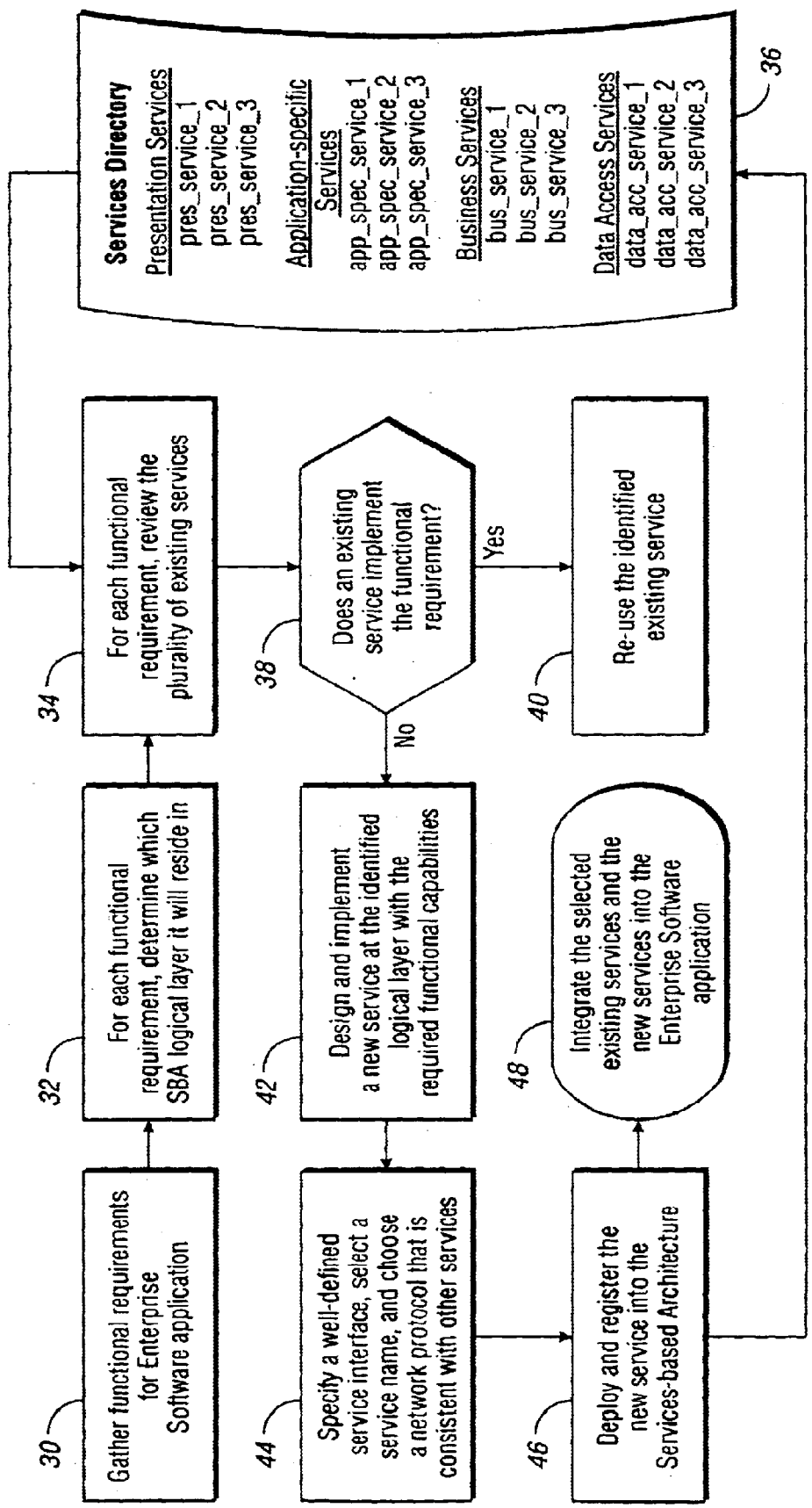
FIG. 2 is a flow chart illustrating the development process using the services-based architecture model, in accordance with the present invention.

Referring now to FIG. 2, a services-based method for developing software using the services-based architecture 10 is illustrated. The first step, as represented by block 30, is to gather the functional requirements for the enterprise software application to be constructed. At block 32, it is determined for each functional requirement which logical layer will satisfy a particular required function. At block 34, the software developer reviews the plurality of existing services for each functional requirement. Generally, a large business concern or enterprise will have an extensive number of existing software applications which provide a variety of services. Information about the plurality of services resides in a services directory, as represented at block 36, and are categorized by logical layer as shown. If the software developer finds that an existing service implements the same functional requirement as desired of the new application, the developer will then reuse the existing identified service, as represented by blocks 38 and 40.

However, if the developer finds that there is not an existing service which implements the required function the developer must then design and implement a new service at the identified logical layer with the required functional capabilities, as represented at block 42. In developing a new service the developer must specify a well-defined service interface, select a name for the service, and use a network protocol that is consistent with other services currently being used, as represented by block 44. The network protocol that is selected for use by each service should be one that is generally available in the business computing industry, such as TCP/IP, IIOP, MQ Series, or HTTP. The new service is then deployed and registered in the services directory, as represented by blocks 46 and 36. Finally, the existing services and newly developed services are integrated to create the new enterprise software application, as represented by block 48.

Figure 3:
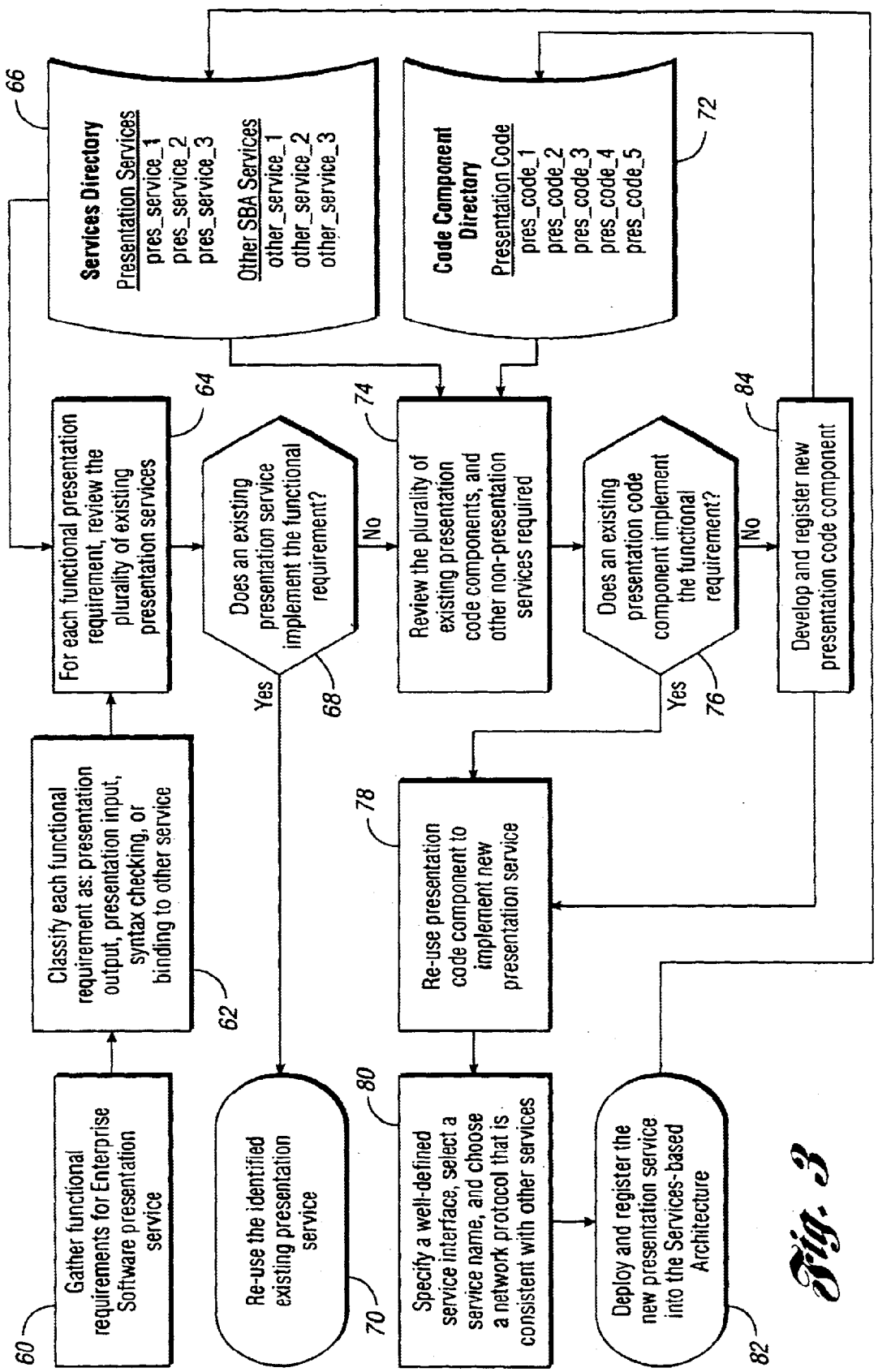
FIG. 3 is a flow chart illustrating a process for developing a presentation service, in accordance with the present invention.

Referring now to FIG. 3, a method for developing a software presentation service is illustrated. The method is initiated by first gathering the functional requirements for the enterprise software presentation service, as represented by block 60. At block 62, each functional requirement of the presentation service is classified as either presentation output, presentation input, syntax checking, or binding to other services. The software developer, at block 64, determines whether a particular functional requirement may be satisfied by existing presentation services by reviewing the services directory, as represented by block 66. If an existing presentation service implements the required function, the software developer will reuse the identified existing presentation service, as represented by blocks 68 and 70.

Accordingly, if an existing presentation service does not implement the functional requirement sought, the developer must review the plurality of existing presentation code components, as represented by blocks 74 and 72. After reviewing the plurality of the existing presentation code components, the developer determines whether an existing presentation code component implements the functional requirement sought, and if it does, the developer will reuse the presentation code component to implement the new presentation service, as represented by blocks 76 and 78. A well-defined service interface, a service name, and a network protocol that is consistent with other services, must then be specified, as represented by block 80. Finally, the developer must deploy and register the new presentation service with the services directory, as represented at blocks 82 and 66.

Although, if the developer finds that for a particular functional requirement there does not exist a presentation code component, the developer must develop and then register the new presentation code component with the code component directory, as represented by blocks 84 and 72. This new code component may then be used to construct a new presentation service, as represented by blocks 78 and 80.

Figure 4:
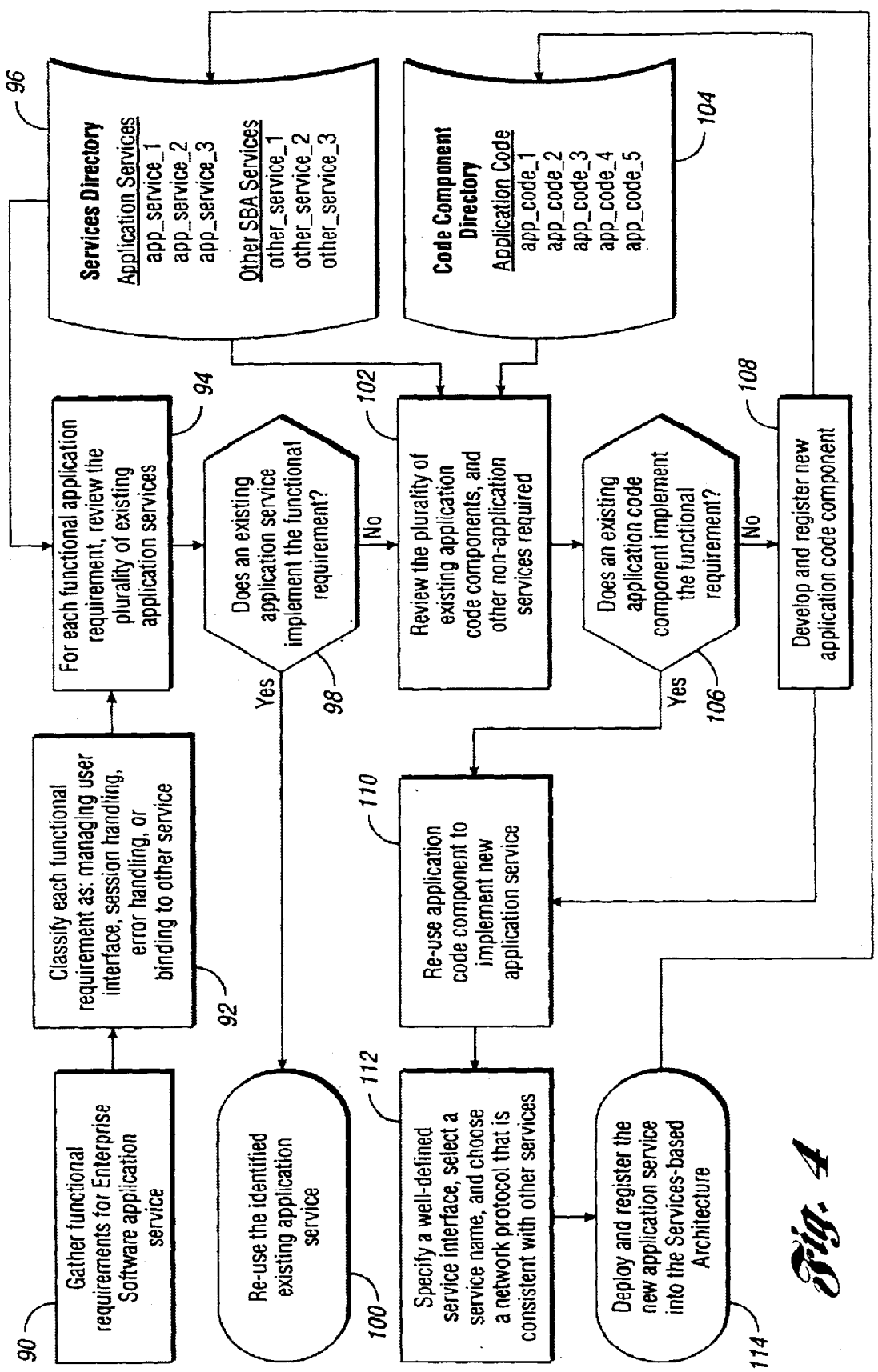
FIG. 4 is a flow chart illustrating a process for developing an application-specific service, in accordance with the present invention.

FIG. 4 illustrates a development method for creating an application-specific service for the application-specific service layer, in accordance with the present invention. First, the functional requirements are determined for the enterprise application-specific service, as represented by block 90. Each functional requirement is then classified as managing the user interface, session handling, error handling, or binding to other services, as represented by block 92. The developer, as represented by block 94, reviews the plurality of existing application-specific services stored in the services directory 96. After reviewing the existing application-specific services, the developer determines whether an existing application-specific service can satisfy the functional requirement sought, as represented by block 98. At block 100, if the developer finds an existing application-specific service which implements the required function, then the existing application-specific service is reused.

However, if there does not exist an application-specific service which implements a particular functional requirement, the developer must review a plurality of existing application-specific code components for each function requirement which is required by the new application-specific service, as represented by blocks 102 and 104. After reviewing the plurality of existing application-specific code components, the developer determines whether existing application-specific code components fulfill a particular functional requirement, as represented by block 106. If the developer finds that there is no existing application-specific code component which fulfills the required function, the developer must develop and register a new application-specific code component, as represented by blocks 108 and 104.

Accordingly, if the developer finds that there is an existing application-specific code component which implements the functional requirement sought, the developer will reuse the application-specific code component to implement the new application-specific service, as represented by block 110. The developer must specify a well-defined service interface, select a name for the service, and use a network protocol that is consistent with other services, as represented by block 112. Finally, the developer deploys and registers the new application-specific service with the services directory 96, as represented by block 114.

Figure 5:
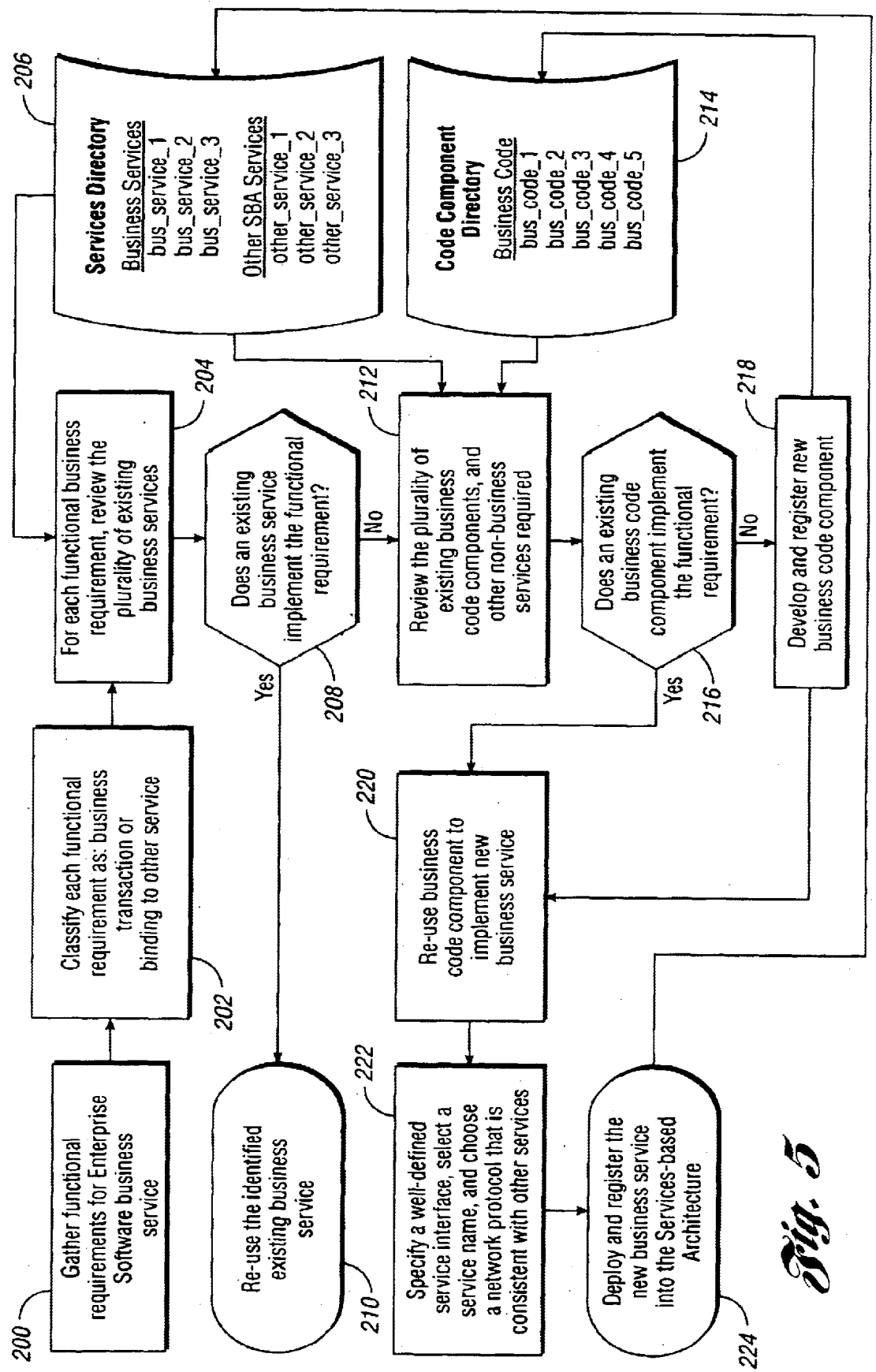
FIG. 5 is a flow chart illustrating the process for developing a business service, in accordance with the present invention.

Referring now to FIG. 5, a development method for creating a business service for the business services layer is illustrated, in accordance with the present invention. First, the functional requirements are determined for the enterprise business service, as represented by block 200. Each functional requirement is then classified as a business transaction or binding to other services, as represented by block 202. The developer, as represented by block 204, reviews the plurality of existing business services stored in the services directory 206. After reviewing the existing business services, the developer determines whether an existing business service can satisfy the functional requirement sought, as represented by block 208. At block 210, if the developer finds that an existing business service implements the required function, the existing business service is reused.

However, if a business service does not exist which implements a particular functional requirement, the developer must review the plurality of existing business code components for each functional requirement for the new business service, as represented by blocks 212 and 214. After reviewing the plurality of existing business code components, the developer determines whether existing business code components fulfill a particular functional requirement, as represented by block 216. If the developer finds that there is no existing business code component which fulfills the required function, the developer must develop and register a new business code component, as represented by blocks 218 and 214.

Accordingly, if the developer finds that there is an existing business code component which implements the functional requirement sought, the developer will reuse the business code component to implement the new business service, as represented by block 220. The developer must specify a well-defined service interface, select a service name, and use a network protocol that is consistent with other services, as represented by block 222. Finally, the developer deploys and registers the new business service with the services directory 206, as represented by block 224.

Figure 6:
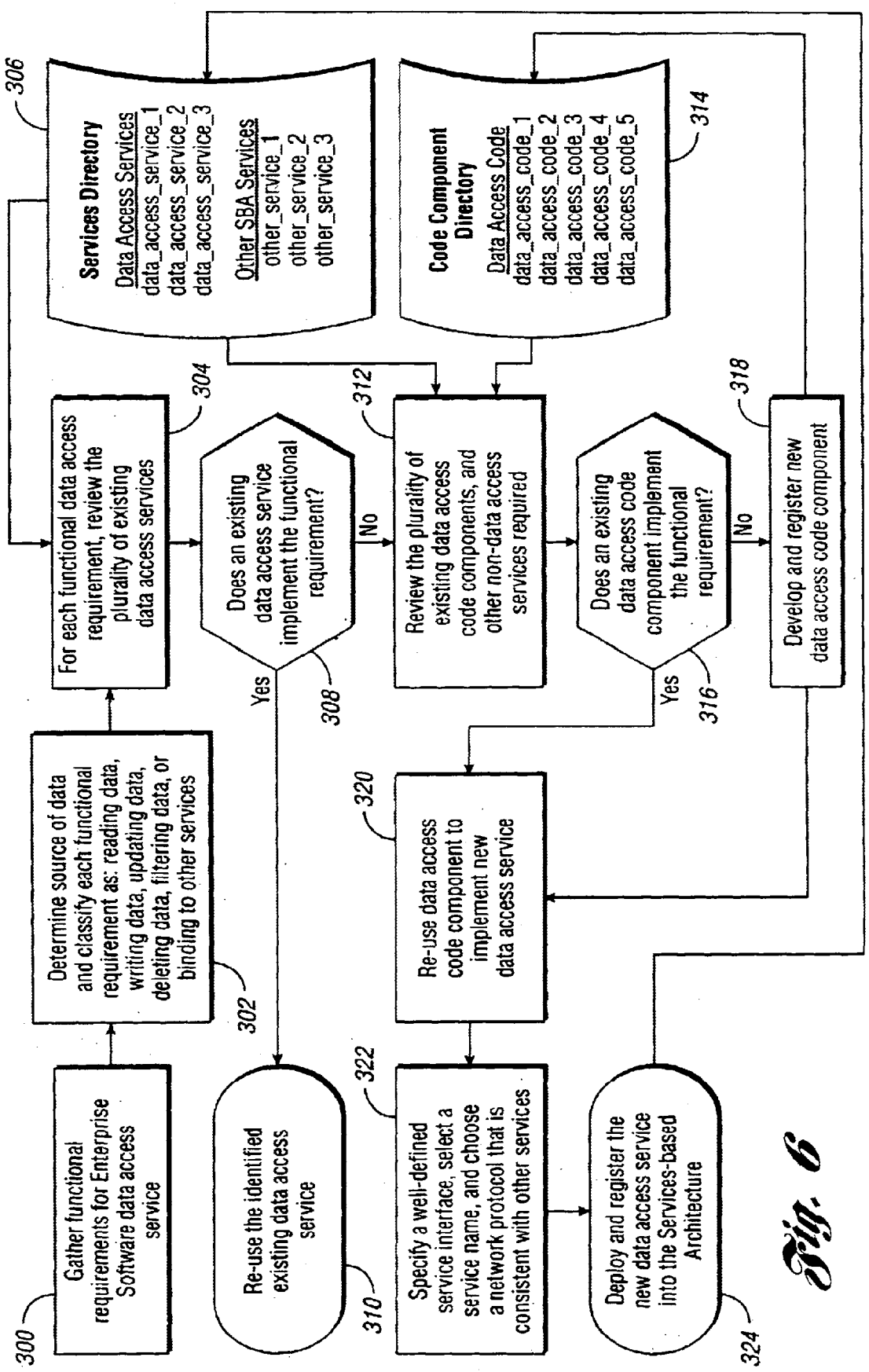
FIG. 6 is a flow chart illustrating a process for developing a data access service, in accordance with the present invention.

Referring now to FIG. 6, a development method for creating a data access service for the data access service layer is illustrated, in accordance with the present invention. First, the functional requirements are determined for the enterprise data access service, as represented by block 300. Each functional requirement is then classified as reading data, writing data, updating data, deleting data, filtering data, or binding to other services, as represented by block 302. The developer, as represented by block 304, reviews the plurality of existing data access services stored in the services directory 306. After reviewing the existing data access services, the developer determines whether an existing data access service can satisfy the functional requirement sought, as represented by block 308. At block 310, if the developer finds an existing data access service implements the required function, the existing data access service is reused.

However, if a data access service does not exist which implements a particular functional requirement, the developer must review the plurality of existing data access code components for each functional requirement which is required by the new data access service, as represented by blocks 312 and 314. After reviewing the plurality of existing data access code components, the developer determines whether existing data access code components fulfill a particular functional requirement, as represented by block 316. If the developer finds that there is no existing data access code component which fulfills the required function, the developer must develop and register a new data access code component, as represented by blocks 318 and 314.

Accordingly, if the developer finds that there is an existing data access code component which implements the functional requirement sought, the developer will reuse the data access code component to implement the service, as represented by block 320. The developer must specify a well-defined service interface, select a name for the service, and use a network protocol that is consistent with other services, as represented by block 322. Finally, the developer deploys and registers the new data access service with the services directory 306, as represented by block 324.

Figure 7:
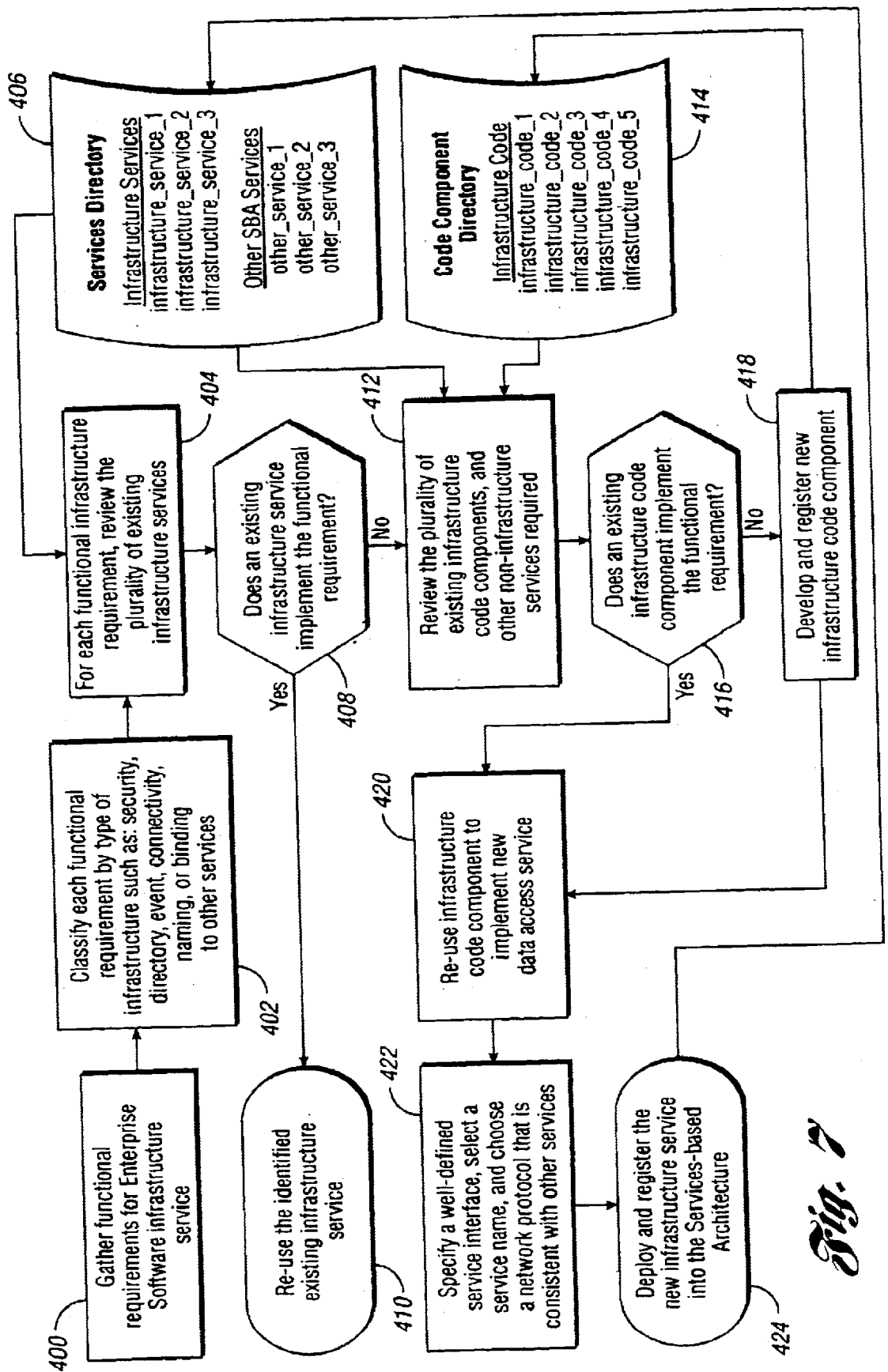
FIG. 7 is a flow chart illustrating a process for developing an infrastructure service, in accordance with the present invention.

Referring now to FIG. 7, a development method for creating an infrastructure service for the infrastructure services layer is illustrated, in accordance with the present invention. First, the functional requirements are determined for the enterprise infrastructure service, as represented by block 400. Each functional requirement is then classified by type of infrastructure, such as security, directory, event, connectivity, naming, or binding to other services, as represented by block 402. The developer, as represented by block 404, reviews the plurality of existing infrastructure services stored in the services directory 406. After reviewing the existing infrastructure services, the developer determines whether an existing infrastructure service can satisfy the functional requirement sought, as represented by block 408.

At block 410, if the developer finds an existing infrastructure service implements the required function, the existing infrastructure service is reused.

However, if an infrastructure service which implements a particular functional requirement does not exist, the developer must review the plurality of existing infrastructure code components for each functional requirement which is required by the new infrastructure services, as represented by blocks 412 and 414. After reviewing the plurality of existing infrastructure code components, the developer determines whether existing infrastructure code components fulfill a particular functional requirement, as represented by block 416. If the developer finds that there is no existing infrastructure code component which fulfills the required function, the developer must develop and register a new infrastructure code component, as represented by blocks 418 and 414.

Accordingly, if the developer finds that there is an existing infrastructure code component which implements the functional requirement sought, the developer will reuse the infrastructure code component to implement the service, as represented by block 420. The developer must specify a well-defined service interface, select a service name, and use a network protocol that is consistent with other services, as represented by block 422. Finally, the developer deploys and registers the new infrastructure service with the services directory 406, as represented by block 424.

The present invention has many advantages and benefits over the prior art. For example the present invention increases the efficiency of a business enterprise by utilizing services-based applications which are composed of independently running services that may be used to build new applications by a recombination of the existing services, and the addition of new services. Moreover, the time required to create a new services-based application is greatly reduced resulting large financial savings for the business enterprise. Management of applications built out of a cooperating set of services is more efficient because a common management tool may be used to monitor and operate the plurality of existing services. Many other uses, advantages, and benefits may be foreseen for the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for developing an enterprise software for a business enterprise, the method comprising:
    determining a set of functional requirements the enterprise software is required to perform;
    ascertaining which of a set of service layers the functional requirements resides in;
    reviewing a plurality of existing software services to determine whether an existing software service can satisfy a portion of the set of functional requirements;
    selecting from the plurality of existing software services to satisfy the portion of the set of functional requirements the software is required to perform;
    creating at least one new software service to satisfy a remainder of the set of functional requirements that the existing software services are unable to perform; and
    integrating the selected existing software services and the at least one new software service into a single enterprise software application for performing the set of functional requirements.

2. The method of claim 1 further comprising specifying a known service interface and network protocol that is consistent with the existing services.

3. The method of claim 1 wherein reviewing a plurality of existing software services further comprises examining a services directory.

4. The method of claim 3 further comprising registering the new software service with the services directory for subsequent reuse.

5. The method of claim 1 further comprising naming the new software service.

6. A method for developing enterprise software for a business enterprise, the method comprising:
    creating a logical layering framework for organizing a set of software services, the logical layering framework having a plurality of framework logical layers comprising
        (a) a presentation services layer having at least one presentation service for interacting with a user,
        (b) an application-specific services layer having at least one application-specific service for managing a user interface,
        (c) a business services layer having at least one business service for performing a business transaction requested by the application-specific service,
        (d) a data access services layer having at least one data access service for accessing data requested by the business service,
        (e) a data source layer having at least one data source for storing and providing a quantity of data to the data access service, and
        (f) an infrastructure services layer having at least one infrastructure service for providing connectivity between the presentation, application-specific, business, data access, and source data services layers;
    gathering a plurality of functional requirements for the enterprise software to be developed;
    determining, for each of the plurality of functional requirements, which framework logical layer will satisfy the functional requirement;
    reviewing, for each of the plurality of functional requirements, already existing software services at the same framework logical layer as the functional requirement; and
    for each of the plurality of functional requirements not met by already existing software services, creating a new software service at the framework logical layer determined for the functional requirement.

7. A method for developing enterprise software for a business enterprise as in claim 6 wherein reviewing already existing software services comprises examining a services directory, the services directory listing each already existing software service based on the logical layering framework.

8. A method for developing enterprise software for a business enterprise as in claim 7 further comprising listing each newly created are service in the services directory.

9. A method for developing enterprise software for a business enterprise as in claim 6 wherein the presentation services layer includes services for human viewable inputs and outputs, intra-text field syntax checking, inter-text field syntax checking, binding to application-specific services and infrastructure services.

10. A method for developing enterprise software for a business enterprise as in claim 6 wherein the application-specific services layer includes services for maintaining a user's session information, handling a user error, handling system errors, locating a business service, locating an infrastructure service, binding to the business service, and binding to the infrastructure service.

11. A method for developing enterprise software for a business enterprise as in claim 6 wherein the business services layer includes services for locating a data access service, an infrastructure service, binding to the data access service and binding to an infrastructure service.

12. A method for developing enterprise software for a business enterprise as in claim 6 wherein the data access services layer includes at least one data access service for filtering data requested by a business service.

13. A method for developing enterprise software for a business enterprise as in claim 6 wherein the infrastructure services layer includes a plurality of infrastructure services for providing management services, event services, directory services, and security services.

* * * * *